Figure 4:
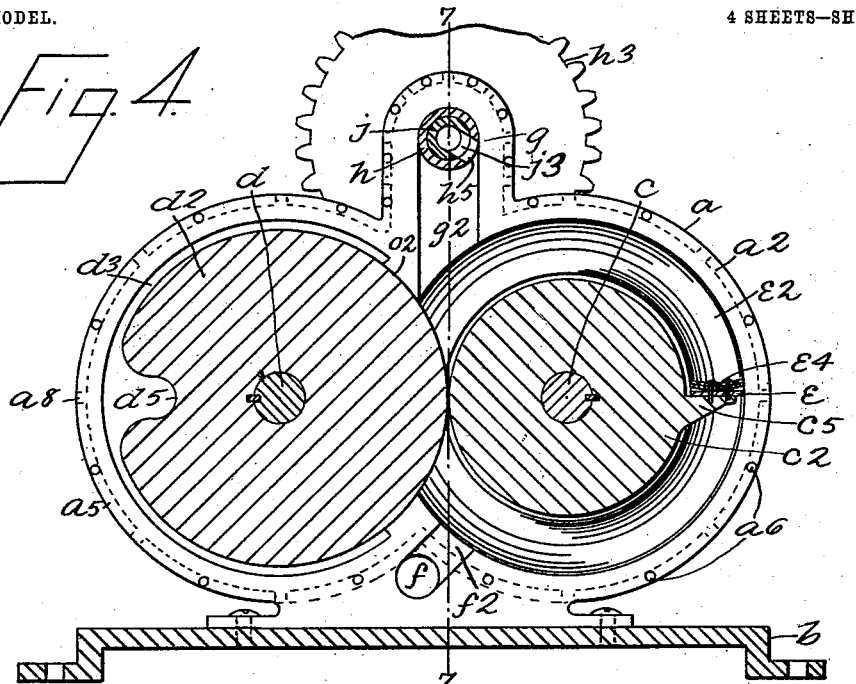

No. 722,742. PATENTED MAR. 17, 1903.
T. OLIVER.
ROTARY ENGINE.
APPLICATION FILED JULY 11, 1902.
NO MODEL. 4 SHEETS—SHEET 1.
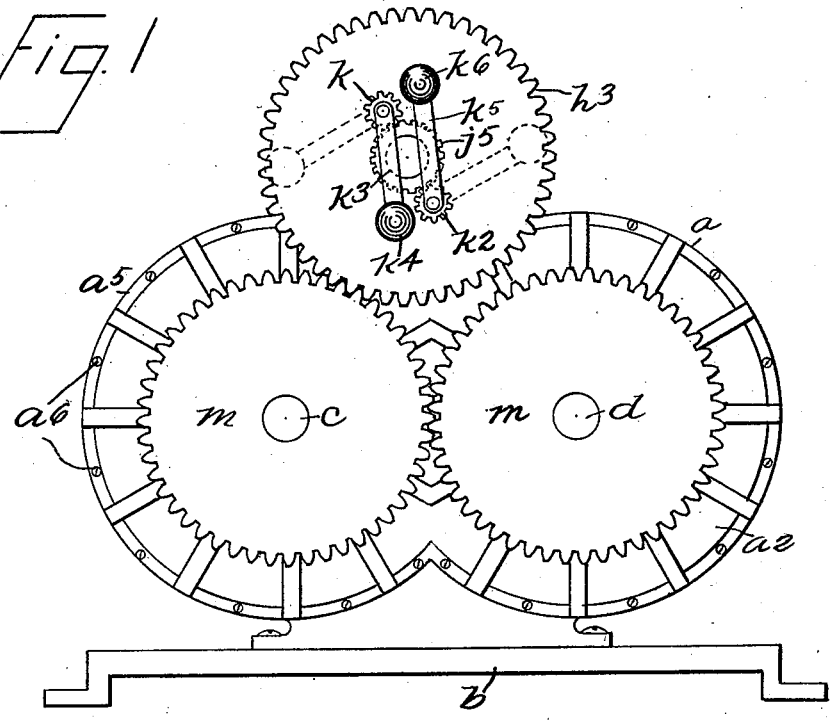
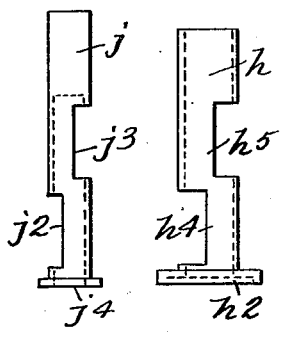
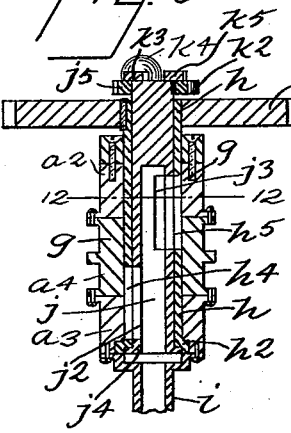
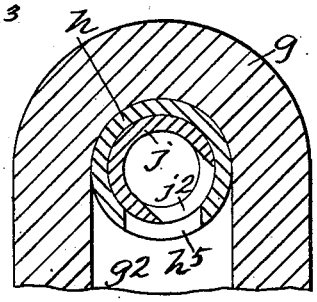
WITNESSES
J. C. Larsen
F. A. Stewart
INVENTOR
Thomas Oliver
BY
Edgar Sate & Co
ATTORNEYS No. 722,742. PATENTED MAR. 17, 1903.
T. OLIVER.
ROTARY ENGINE.
APPLICATION FILED JULY 11, 1902.
NO MODEL. 4 SHEETS—SHEET 2.
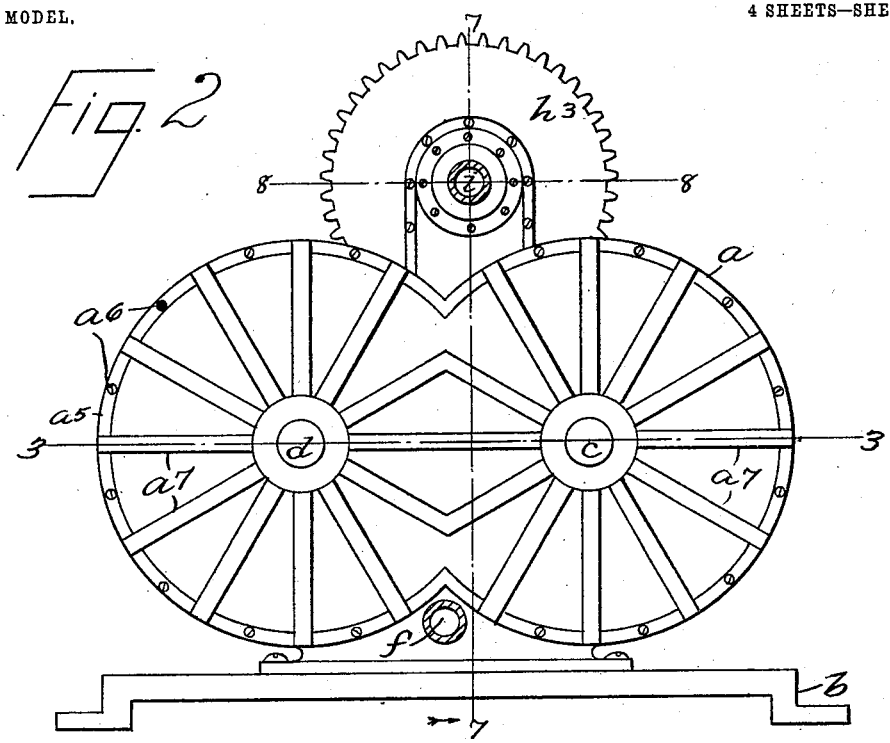
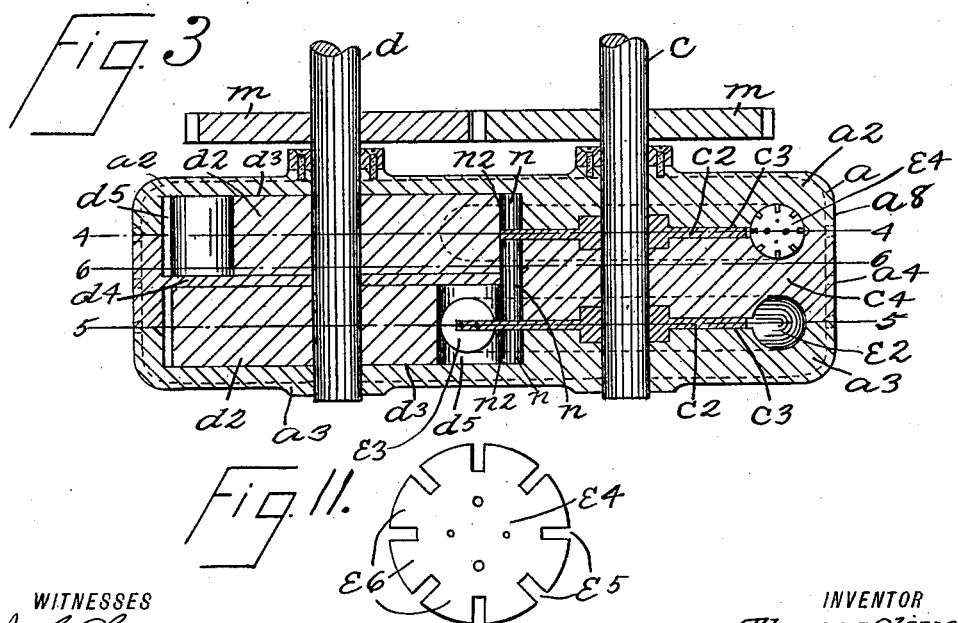
WITNESSES
J. C. Larsen
F. A. Stuvart
INVENTOR
Thomas Oliver.
BY
Edgar Tate & Co.
ATTORNEYS No. 722,742. PATENTED MAR. 17, 1903.
T. OLIVER.
ROTARY ENGINE.
APPLICATION FILED JULY 11, 1902.
NO MODEL. 4 SHEETS—SHEET 3.

WITNESSES
J. C. Larsen
F. A. Stewart

INVENTOR
Thomas Oliver.
BY
Edgar Tate & Co
ATTORNEYS

No. 722,742. PATENTED MAR. 17, 1903.
T. OLIVER.
ROTARY ENGINE.
APPLICATION FILED JULY 11, 1902.
NO MODEL. 4 SHEETS—SHEET 4.
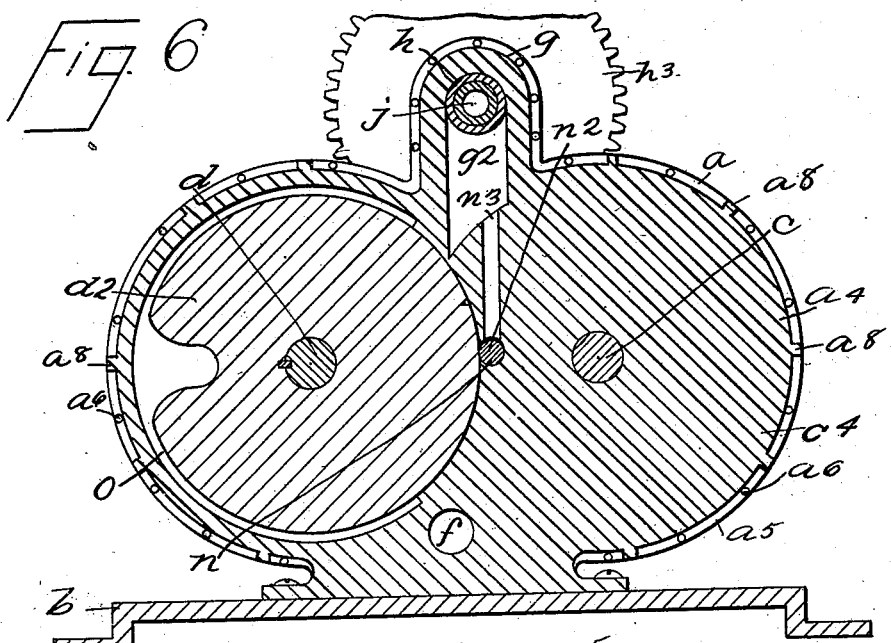
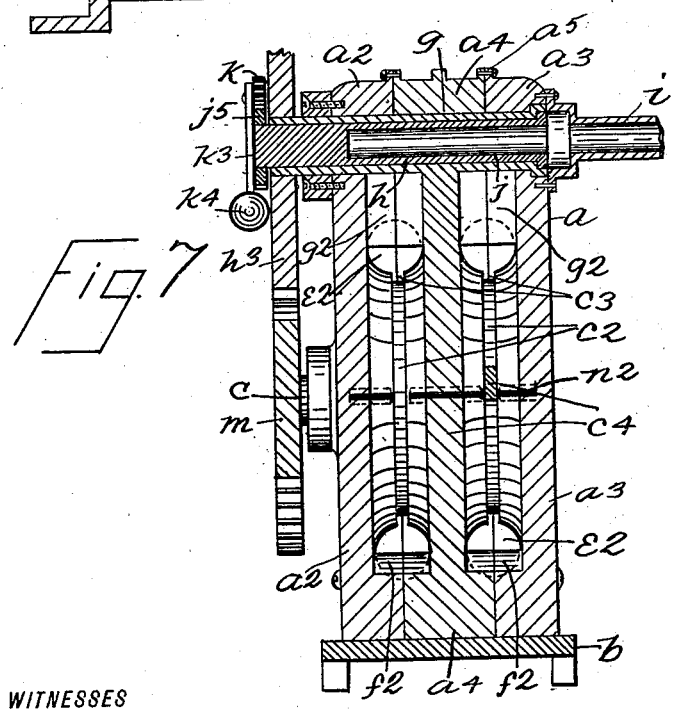 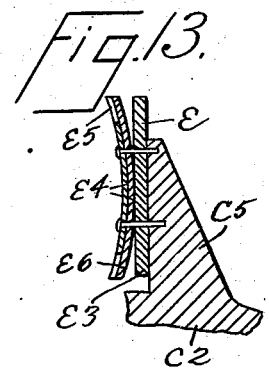
WITNESSES
J. C. Larsen
F. A. Stuart
INVENTOR
Thomas Oliver
BY
Edgar Tate & Co
ATTORNEYS

UNITED STATES PATENT OFFICE.

THOMAS OLIVER, OF BROOKLYN, NEW YORK.

ROTARY ENGINE.

SPECIFICATION forming part of Letters Patent No. 722,742, dated March 17, 1903.

Application filed July 11, 1902. Serial No. 115,118. (No model.)

*To all whom it may concern:*

Be it known that I, THOMAS OLIVER, a citizen of the United States, residing at Brooklyn, in the county of Kings and State of New York, have invented certain new and useful Improvements in Rotary Engines, of which the following is a full and complete specification, such as will enable those skilled in the art to which it appertains to make and use the same.

The object of this invention is to provide a rotary engine which is simple in construction, strong and durable in operation, and comparatively inexpensive and which will operate smoothly and with a minimum amount of vibration, jolt, or jar, a further object being to provide an engine of the class specified which will produce the highest possible power in proportion to the steam or other power agent employed and which is composed of the fewest possible parts and will not easily get out of order or frequently need repair, a further object being to provide an engine of the class specified with an improved governor which is especially designed therefor and which will operate with the greatest exactness and will automatically regulate at all times the speed and operation of the engine.

The invention is fully disclosed in the following specification, of which the accompanying drawings form a part, in which the separate parts of my improvement are designated by the same reference characters in each of the views, and in which—

Figure 5:
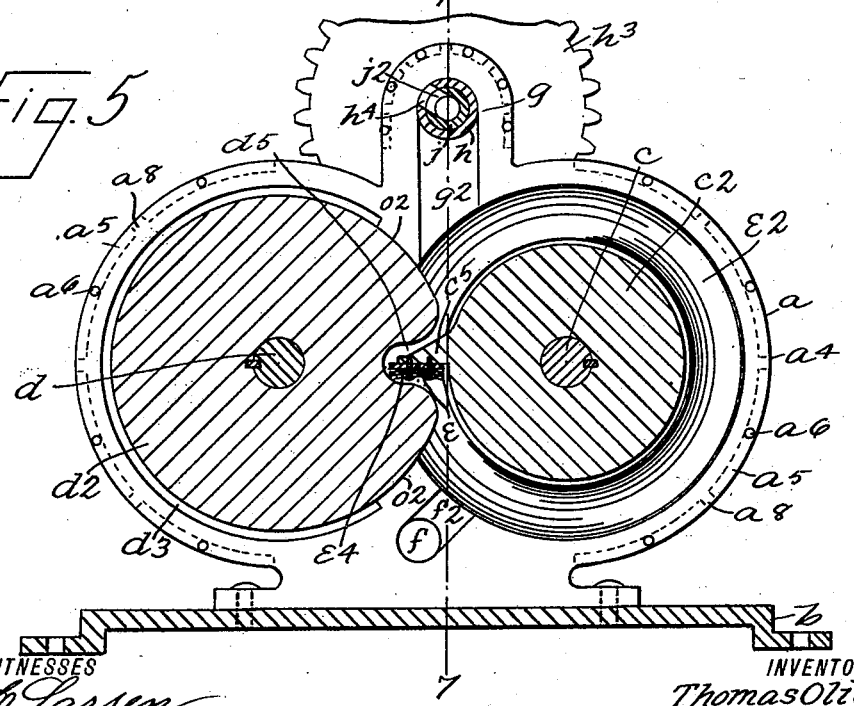

Figure 1 is a front elevation of my improved rotary engine; Fig. 2, a rear elevation thereof; Fig. 3, a section on the line 3 3 of Fig. 2; Fig. 4, a section on the line 4 4 of Fig. 3; Fig. 5, a section on the line 5 5 of Fig. 3; Fig. 6, a section on the line 6 6 of Fig. 3; Fig. 7, a section on the line 7 7 of Fig. 1 and on the line 7 7 of Fig. 5; Fig. 8, a section on the line 8 8 of Fig. 2; Fig. 9, a side view of a valve-tube which I employ; Fig. 10, a similar view of another valve-tube which I employ; Fig. 11, a plan view of a piston-disk which I employ; Fig. 12, a section on the line 12 12 of Fig. 8 and on an enlarged scale, and Fig. 13 an enlarged sectional view of one of the pistons which I employ.

In the practice of my invention I provide a main casing $a$, composed of a front side member $a^2$, a back side member $a^3$, and a central member $a^4$, and these members of the main casing are provided with flanges $a^5$, by which they are secured together by means of bolts or screws $a^6$. The front and back parts of the casing $a$ are also provided with radial strengthening-ribs $a^7$, and the faces of said casing, or the sides and top thereof, are provided with transverse strengthening-ribs $a^8$, and the horizontal section of the engine shown in Fig. 3 is taken through these strengthening-ribs. This casing $a$, however, may be made in any desired manner and may be made heavy enough to give the required strength without the strengthening-ribs above referred to. The casing $a$ is oblong in horizontal section, as clearly shown in Fig. 3, and is bolted to a suitable base $b$, which may be mounted on any suitable support or supports.

Passing through the sides of the casing $a$ are two shafts $c$ and $d$, the shaft $c$ being in the left-hand side of the casing $a$ and the shaft $d$ in the right-hand side thereof, as shown in Fig. 1, and mounted on the shaft $d$ within the casing $a$ are two disks or wheels $d^2$, and these disks or wheels $d^2$, as shown in the drawings, are of considerable thickness and occupy corresponding circular chambers $d^3$, formed in the casing $a$ and in the adjacent side surfaces of the parts $a^2$, $a^3$, and $a^4$ of said casing, as clearly shown in Fig. 3, and separated by a vertical partition $d^4$, formed integrally with the central part $a^4$ of the casing $a$. The disks or wheels $d^2$ are keyed to the shaft $d$, as shown in Figs. 4 and 5, or may be secured to said shaft in any desired manner, and said disks or wheels are each provided at diagonally opposite points with a recess $d^5$, which is formed in the perimeter thereof, as clearly shown in Figs. 3, 4, and 5.

Secured to the shaft $c$ are two piston-disks $c^2$, which move in circular chambers or recesses $c^3$, formed in the adjacent side surfaces of the parts $a^2$, $a^3$, and $a^4$ of the casing $a$, as clearly shown in Fig. 3, and said chambers or spaces are separated by an intermediate part $c^4$ of the part $a^4$ of the casing $a$, and these piston-disks are each provided at diametrically-opposite points of their perimeter with projections $c^5$, each of which is provided with a piston $e$. The pistons $e$ operate in annular piston-chambers $e^2$, which inclose the piston-disks $c^2$ and are in communication with the circular chambers and recesses $c^3$, in which said piston-disks are placed, this construction being clearly shown in Figs. 3 and 4, and in one side of the main casing $a$, and near the bottom thereof and directly under the central portion thereof is a steam-exhaust port or passage $f$, and this steam-exhaust port or passage $f$ is placed in communication with each of the annular steam piston-chambers $e^2$ by means of a supplemental passage $f^2$. At the top of the main casing $a$ is a valve-casing $g$, formed by the parts $a^2$, $a^3$, and $a^4$ of the main casing, said parts of said main casing being provided with upwardly-directed extensions for this purpose, and in this supplemental casing $g$ are vertically-arranged steam-chambers $g^2$, which are in communication at their lower ends with the corresponding annular piston-chambers $e^2$, and in the top portion of the steam-chambers $g^2$ is placed a main valve-tube $h$, which extends entirely through the said valve-casing $g$, and the rear end of which is provided with an annular flange or rim $h^2$, which fits in a corresponding groove formed in the rear end of the valve-casing $g$, and the front end of said valve-tube is provided with a large gear-wheel $h^3$. The rear end of the valve-tube $h$ is flushed with the rear end of the valve-casing $g$, and secured to said rear end of the valve-casing $g$ is a steam-supply pipe $i$, and said valve-tube $h$ is provided in the opposite sides thereof with ports or passages $h^4$ and $h^5$, the port or passage $h^4$ being at the rear end thereof and the port or passage $h^5$ being midway thereof. Within the main valve-tube $h$ is placed a supplemental valve-tube $j$, having in its opposite sides ports or passages $j^2$ and $j^3$, the port or passage $j^2$ being near the rear end thereof and the port or passage $j^3$ about midway thereof, and said ports or passages $j^2$ and $j^3$ in the valve-tube $j$ are adapted to register, in the operation of the engine, with the ports or passages $h^4$ and $h^5$ in the valve-tube $h$. The valve-tube $j$ is provided at its rear end with a flange $j^4$, which fits in the rim $h^2$ of the valve-tube $h$, and said valve-tube $j$ is provided at its front end with a small gear-wheel $j^5$.

Connected with the gear-wheel $h^3$ above and below the small gear-wheel $j^5$ on the valve-tube $j$ are two pinions $k$ and $k^2$, the pinion $k$ being above and slightly to the left and the vertical center of the gear-wheel $j^5$ and the pinion $k^2$ being below and slightly to the right of said gear-wheel $j^5$, and connected with the pinion $k$ is a downwardly-directed arm $k^3$, provided at its lower end with a ball $k^4$, and connected with the pinion $k^2$ is an upwardly-directed arm $k^5$, provided at its upper end with a ball $k^6$, and the pinions $k$ and $k^2$ mesh with and operate in connection with the small gear-wheel $j^5$, and this mechanism, including the valve-tubes $h$ and $j$, the gear-wheel $h^3$, secured to the valve-tube $h$, the gear-wheel $j^5$, secured to the valve-tube $j$, the pinions $k$ and $k^2$, connected with the gear-wheel $h^3$, and the arms $k^3$ and $k^5$, provided with the balls $k^4$ and $k^6$, constitutes my improved combination valve mechanism and governor, the operation of which will be hereinafter described.

Each of the shafts $c$ and $d$ is provided with a large gear-wheel $m$, and the gear-wheel $h^4$ on the valve-tube $h$ meshes with and operates in connection with the gear-wheel $m$ on the shaft $c$, and the said gear-wheels $m$ on the shafts $c$ and $d$ mesh with and operate in connection with each other, and said shafts $c$ and $d$ are thus geared in connection, the shaft $c$ being also geared in connection with the main valve-tube $h$.

It will be observed that the circular chambers or spaces $d^3$, in which the disks or wheels $d^2$ are placed, are in communication with the annular piston-chambers $e^2$, and the disks or wheels $d^2$ cut into said annular piston-chambers at the central portion of the engine, the perimeters of said disks or wheels being closely adjacent to or flush with the perimeters of the piston-disks $c^2$, and by means of this construction the steam is prevented from passing around the piston-disks at this point, and formed transversely in the inner walls of the annular piston-chambers $e^2$ at the point where the perimeters of the disks or wheels $d^2$ come in contact with the piston-disks are transverse cylindrical recesses $n$, in which are placed packing-cylinders $n^2$, three of which are employed, and these packing-cylinders $n^2$ are separated by the piston-disks $c^2$, and communicating with the cylindrical recesses $n$, in which the packing-cylinders $n^2$ are placed, is a transverse port or passage $n^3$, which extends upwardly through the parts of the casing $a$ and is in communication with the steam-chambers $g^2$ in the valve-casing $g$, and in the operation of the engine, as hereinafter described, the steam passes downwardly through the steam-chambers $g^2$, through the passage $n^3$, and operates upon the back and top of the packing-cylinders $n^2$ and forces the same into close contact with the perimeters of the disks or wheels $d^2$, so as to prevent the steam from passing around said disks or wheels and around the annular piston-chambers $e^2$.

The main part of the chambers $d^3$, in which the disks or wheels $d^2$ are placed, is greater in diameter than said disks or wheels, as shown in Figs. 4 and 5, whereby thin segmental spaces $o$ are formed between the perimeters of the disks or wheels and the walls of said chambers, the object of this construction being to reduce friction; but it will be seen that at the top and bottom portions of said chambers and near the points where the disks or wheels $d^2$ cut into the annular piston-chambers $e^2$ are bearing-points $o^2$, against which the perimeters of the disks or wheels $d^2$ bear, so as to prevent the steam from passing into the spaces $o$.

The pistons $e$, as shown in Fig. 13, are composed of a supporting-disk $e^3$, which is of slightly less diameter than the annular piston-chambers $e^2$, and connected with the disk $e^3$ are a plurality of small disks $e^4$, preferably two in number, and each of which is provided at its perimeter with radial recesses $e^5$, forming radial sectorial members $e^6$, and the members $e^6$ are secured to the disk $e^3$, so that the sectorial members $e^6$ of one of the disks $e^4$ will overlap the recesses $e^5$ in the other disk. The disks $e^4$ are composed of thin elastic material, and when connected with the disk $e^3$ they are made concave on the steam side thereof and convex on the opposite side, and said disks $e^4$ are preferably slightly greater in diameter than the supporting-disk $e^3$, and when the steam strikes these disks $e^4$ in the operation of the engine, hereinafter described, the said disks $e^4$ are flattened, as will be readily understood, and are thus caused to closely fit the annular piston-chambers $e^2$, which are circular in cross-section. In the operation of the pistons, as hereinbefore described, the disks $e^4$ are not absolutely flattened by the pressure of the steam; but the form of this disk is such that the action of the steam thereon expands them or causes the perimeters thereof to press tightly against the walls of the piston-chambers $e^2$.

It will be understood that the separate sets of ports or passages in the valve-tubes $h$ and $j$ communicate with the separate steam-chambers $g^2$ in the valve-casing $g$, and the operation of my improved engine will be readily understood from the foregoing description when taken in connection with the accompanying drawings and the following statement thereof.

Supposing the parts to be in the position shown in Figs. 1 and 2, if steam be admitted through the pipe $i$ it will be discharged directly into the front annular piston-chambers $e^2$ and will operate on the corresponding piston in said chamber. The shaft $c$ will be turned and with it the shaft $d$, together with the gear-wheel $h^3$, which will turn the main valve-tube $h$, and as the shafts $d$ and $c$ continue to turn the steam in the front piston-chamber $e^2$ will be exhausted through the port or passage $f$ and the steam will be thrown into the rear piston-chambers $e^2$ and will operate on the corresponding piston therein, and this operation will continue, the steam being alternately thrown into one of said piston-chambers and exhausted from the other. In this operation the main valve-tube $h$ is constantly turned and the supplemental piston-tube $j$ turns therewith and the steam alternately passes through the separate pairs of ports or passages $j^2$ and $h^4$ and $j^3$ and $h^5$ in said tubes. If at any time the speed of the engine is raised beyond the desired point, the increased motion of the wheel $h^3$ will operate to throw out the arms $h^3$ and $h^5$, as shown in dotted lines, and to turn the supplemental valve-tube $j$, so as to cut off the supply of steam through the ports or passages in the valve-tubes $h$ and $j$, and in Fig. 12 one of said ports or passages is shown as partly closed by this operation. It will be seen that the operation of the combination valve and governor mechanism is automatic at all times, and the construction and arrangement thereof are such that the operation of the engine is exactly and positively controlled at all times.

In practice either of the shafts $c$ or $d$ may serve as a power-shaft for transmitting power from the engine to any kind or sort of a machine or for transmitting power for use for any purpose, and in order to reverse the operation of a machine operated by my improved rotary engine through either of the shafts $c$ or $d$ all that is necessary is to change the shaft in connection with which the machine is geared, it being apparent that the shafts $c$ and $d$ are turned in opposite directions.

The wheels or disks $d^2$, in addition to operating in connection with the piston-disks and pistons, as herein shown and described, also serve as balance-wheels or fly-wheels to balance the engine and to render the same more regular and positive in action.

My invention is not limited to the exact form and construction of the main and supplemental casings as herein described, and it will be apparent that changes in and modifications of the operative parts of my improved engine may be made without departing from the spirit of my invention, and I reserve the right to make all such alterations therein and modifications thereof as fairly come within the scope of my invention.

Having fully described my invention, what I claim as new, and desire to secure by Letters Patent, is—

1. A rotary engine provided with two valve-tubes for controlling the supply of steam thereto, one of said tubes being placed in the other, and the outer tube being geared in connection with a power-shaft, and means whereby the rotation of the outer tube will control the rotation of the inner tube, substantially as shown and described.

2. An engine-piston comprising a plurality of disks of spring material, said disks being provided in the perimeters with notches or recesses, and being secured together so that the space between the notches or recesses in one disk will overlap the notches or recesses in an adjoining disk, substantially as shown and described.

3. A rotary engine comprising a main casing oblong in horizontal section, a supplemental casing arranged centrally over the main casing, shafts passing through the opposite side portions of the main casing and geared in connection, disks or wheels connected with one of said shafts within the main casing and in corresponding chambers formed therein, said disks or wheels being provided in the perimeters thereof and at opposite points each with a cavity or recess, piston-disks connected with the other shaft within the main casing and in corresponding chambers formed therein annular piston-chambers inclosing said piston-disks, pistons connected with said piston-disks and operating in said annular chambers, steam-supply chambers in the supplemental casing and in communication with the said annular piston-chambers, a main valve-tube in said supplemental casing and provided with ports or passages adapted to communicate with the steam-supply chambers, said main valve-tube being provided with a gear-wheel geared in connection with one of said shafts, a supplemental valve-tube placed in the main valve-tube and provided with ports or passages adapted to register with those in said tube, means for supplying steam to the supplemental valve-tube, a gear-wheel connected with the supplemental valve-tube, pinions mounted on the gear-wheel connected with the main valve-tube at the opposite sides of the gear-wheel connected with the supplemental valve-tube, and arms connected with said pinions, substantially as shown and described.

4. A steam-supply valve and governor for rotary engines, comprising a main valve-tube, gear-wheel connected therewith, a supplemental valve-tube placed in the main valve-tube, said tubes being provided with two sets of ports or passages, a gear-wheel connected with the supplemental valve-tube, pinions connected with the gear-wheel on the main valve-tube and operating in connection with the gear-wheel on the supplemental valve-tube, and arms connected with said pinions, substantially as shown and described.

5. A piston for rotary engines comprising spring-disks having notches or recesses in the perimeter thereof forming sectorial radial members, said disks being secured together so that the sectorial members at the perimeter of one disk will cover the notches or recesses in the perimeter of the other, substantially as shown and described.

6. A rotary engine comprising a main casing which is oblong in horizontal section, a supplemental casing arranged over the main casing centrally thereof, shafts passing through the opposite side portions of the main casing, two disks or wheels on one of said shafts within the main casing and operating in corresponding chambers formed therein, said disks or wheels being provided in the perimeter thereof and at opposite points each with a cavity or recess, two piston-disks connected with the other shaft within the main casing and operating in corresponding chambers therein, annular piston-chambers inclosing said piston-disks and in communication with the chambers in which said disks or wheels are mounted, pistons connected with said piston-disk and movable in said annular chambers, steam-supply chambers in the supplemental casing and in communication with said annular piston-chambers, valve-tubes placed one within the other in the top portion of the supplemental casing and provided with separate sets of ports or passages communicating with said steam-supply chambers, a gear-wheel connected with the said shafts, said shafts being also geared in connection, and automatic devices connected with the inner valve-tube and with the gear-wheel on the outer valve-tube for controlling the supply of steam through said valve-tubes, substantially as shown and described.

In testimony that I claim the foregoing as my invention I have signed my name, in presence of the subscribing witnesses, this 9th day of July, 1902.

THOMAS OLIVER.

Witnesses:
F. A. STEWART,
C. E. MULREANY.